(12) United States Patent
Aulinger et al.

(10) Patent No.: US 8,651,553 B2
(45) Date of Patent: Feb. 18, 2014

(54) TANK CLOSURE

(71) Applicant: Bayerische Motoren Werke Aktiengesellschaft, Munich (DE)

(72) Inventors: Stefan Aulinger, Munich (DE); Hauke Voges, Althegnenberg (DE); Ulrich Schablitzki, Neufahrn (DE); Rainer Blottko, Munich (DE); Hans-Ulrich Stahl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/686,283

(22) Filed: Nov. 27, 2012

(65) Prior Publication Data

US 2013/0082480 A1 Apr. 4, 2013

Related U.S. Application Data

(63) Continuation of application No. PCT/EP2011/055081, filed on Apr. 1, 2011.

(30) Foreign Application Priority Data

May 27, 2010 (DE) .......................... 10 2010 029 354

(51) Int. Cl.
- *B60R 11/00* (2006.01)
- *B65D 55/16* (2006.01)

(52) U.S. Cl.
USPC ...................... 296/97.22; 248/309.1; 220/375

(58) Field of Classification Search
USPC .................. 296/97.22, 146.11, 155; 220/375, 220/203.01, 905, 86.2, DIG. 33; 16/227, 16/255
See application file for complete search history.

(56) References Cited

U.S. PATENT DOCUMENTS

| | | | | |
|---|---|---|---|---|
| 4,142,756 | A | * | 3/1979 | Henning et al. ............ 296/97.22 |
| 4,784,423 | A | | 11/1988 | Pardy |
| 5,580,019 | A | * | 12/1996 | Glesser ...................... 248/309.1 |
| 6,231,106 | B1 | * | 5/2001 | Nagasaka ................... 296/97.22 |
| 7,281,640 | B2 | | 10/2007 | Hagano et al. |
| 2003/0024931 | A1 | * | 2/2003 | Bae ............................... 220/375 |
| 2008/0135552 | A1 | | 6/2008 | Baudoux et al. |

FOREIGN PATENT DOCUMENTS

| | | |
|---|---|---|
| DE | 199 22 042 A1 | 11/1999 |
| DE | 199 07 384 A1 | 8/2000 |
| DE | 102 20 899 B4 | 11/2004 |
| DE | 10 2004 047 016 A1 | 8/2005 |

(Continued)

OTHER PUBLICATIONS

International Search Report dated Aug. 16, 2011 with English translation (four (4) pages).

(Continued)

*Primary Examiner* — Glenn Dayoan
*Assistant Examiner* — Sunsurraye Westbrook
(74) *Attorney, Agent, or Firm* — Crowell & Moring LLP

(57) ABSTRACT

A tank closure system intended for closing a filling opening of a tank includes a tank cap, which closes the filling opening, and a tank flap, which covers the tank cap. The sides of the tank cap and the tank flap that face each other are designed to engage with one another in a positive locking manner by way of a defined shape, when the tank cap is situated in a predetermined position, in which the filling opening is closed, relative to the tank flap.

7 Claims, 2 Drawing Sheets

(56) References Cited

FOREIGN PATENT DOCUMENTS

| | | |
|---|---|---|
| DE | 10 2005 012 572 A1 | 8/2005 |
| DE | 10 2008 036 869 A1 | 2/2010 |
| FR | 2 881 688 A1 | 8/2006 |
| GB | 2 337 252 A | 11/1999 |

OTHER PUBLICATIONS

German Search Report dated Apr. 1, 2011 with partial English translation (nine (9) pages).

* cited by examiner

TANK CLOSURE

CROSS REFERENCE TO RELATED APPLICATIONS

This application is a continuation of PCT International Application No. PCT/EP2011/055081, filed Apr. 1, 2011, which claims priority under 35 U.S.C. §119 from German Patent Application No. 10 2010 029 354.7, filed May 27, 2010, the entire disclosures of which are herein expressly incorporated by reference.

BACKGROUND AND SUMMARY OF THE INVENTION

The invention relates to a tank closure that is intended for closing a filling opening of a tank and comprises a tank cap, which closes the filling opening, and a tank flap, which covers the tank cap. Furthermore, the invention relates to a motor vehicle with a tank closure according to the invention.

For safety reasons and for reasons relating to emission protection, it has to be possible to close the fuel tanks of motor vehicles at their respective tank opening in such a way that they are fluid-tight, in particular gas tight. To this end, tank caps are usually used with a threaded screw cap or a bayonet catch, and the tank cap has to be rotated from an open position into a defined position that tightly closes the tank opening. When the tank cap occupies its correct position, then this fact is usually signaled by means of an end stop or also by a "click noise." In order to ensure that the closure of the tank opening is properly sealed off, it is very important that the tank cap be held in the correct position in the tank opening and that, in the case of an incorrect positioning of the tank cap, an error is reported to the driver.

DE 199 07 384 A1 discloses a motor vehicle with a pivotally mounted tank flap, which covers the tank cap in the closed position; and the tank cap in turn closes the tank filler neck. When the tank cap is closed and the tank flap is situated in the closed position, then a minimum gap of preferably 1 mm to 2 mm is present between the two parts. Therefore, when the tank cap is placed incorrectly or not completely on the tank filler neck, the tank flap rests against the tank cap and, in so doing, projects from a side wall. In this way the incorrectly closed tank filler neck is signaled or indicated to the vehicle occupant.

The above-described state of the art is based on a tank cap with a conventional screw cap with a thread, which exhibits a defined thread pitch. When the tank cap is screwed in, the height is changed as a function of the thread pitch, so that the tank cap protrudes from the filler neck by the amount of said height. If the tank cap is not totally screwed in, then the tank cap protrudes by a certain portion of the height and prevents the tank flap from taking its closed position.

However, tank caps with bayonet catches do not have or have only a slight thread pitch. If a tank cap with a bayonet catch is not correctly screwed into a filler neck, then the tank cap can barely project. In such a case the tank flap occupies the closed position, nevertheless. Incorrectly positioned tank caps are thus not recognized.

Furthermore, the legislature in some countries requires that a leak test of the fuel tank be conducted as a function of certain driving cycles. If a leakage is determined, then a defect must be indicated to the user of the motor vehicle by means of a warning light that lights up with the corresponding information. Some types of vehicles are especially equipped with an electronically controlled detection device for detecting an incorrectly positioned tank cap. In such cases the legislature allows the user to be given only a pointer to the incorrectly positioned tank cap and to dispense with the use of a warning light (for example, with the general information "Service Engine Soon").

It has been demonstrated that tank openings are often incorrectly closed after fuel has been put into the tank of a motor vehicle, a state that results in a warning signal, in particular, in vehicles with a device for conducting an automatic leak test on the fuel tank. It is often the case that the vehicles are brought unnecessarily to a service center for repair or, more specifically, to check the tank. This situation will, in particular, irritate the customer and incur high warranty costs on the part of the manufacturer. Furthermore, if an electronically controlled detection device for detecting an incorrectly positioned tank cap is installed in the vehicle, the production costs will be significantly increased.

Therefore, an object of the present invention is to provide a tank closure that is intended for closing a filling opening of a tank and that is a cost-effective and easy-to-operate alternative to an electronically controlled device for detecting an incorrectly positioned tank cap.

The invention provides a tank closure that is intended for closing a filling opening of a tank and that comprises a tank cap, which closes the filling opening, and comprises a tank flap, which covers the tank cap. The sides of the tank cap and the tank flap that face each other are designed to engage with one another in a positive locking manner by way of a defined shape, when the tank cap is situated in a predetermined position, in which the filling opening is closed, relative to the tank flap.

As explained above, a fuel tank of a motor vehicle has a filling opening that is intended for putting fuel into the tank and that is arranged preferably in, or more specifically on, a tank neck. The filling opening can be closed and opened in a fluid-tight manner by use of a tank closure according to the invention. The tank closure comprises a tank cap and a tank flap. The tank cap forms an inner closure with respect to the fuel tank; and the tank flap forms an outer closure with respect to the fuel tank. The tank flap is mounted on a side wall of the chassis of a vehicle and can either cover selectively the tank cap by way of a first movement in a closed position or release the tank cap again. The tank flap can be brought into the closed position preferably by way of a swivelling, folding, rotating or even sliding mechanism. In the closed position, i.e. in the position of closure, the tank flap closes preferably in such a way that the tank flap is in alignment with the side wall of the vehicle chassis and lies flush with the surface of the adjoining side wall.

The tank cap can be brought into a position, in which it closes the filling opening or opens the filling opening, by way of a second movement. In order to close the tank opening, the tank cap can have, for example, a screw cap that engages with a thread in a wall of the tank neck.

The tank cap has an outer side, or more specifically an outer side face, that faces the tank flap; and the tank flap has an inner side, or more specifically an inner side face, that faces the tank cap. According to an aspect of the invention, the outer side face of the tank cap and the inner side face of the tank flap are designed with a defined shape, or more specifically a surface structure or relief, in such a way that the two side faces engage with one another in a positive locking manner, when the tank cap and the tank flap are in a closed position. The inner side face of the tank flap forms a "negative mold" of the outer side face of the correctly positioned tank cap.

According to an aspect of the invention, the tank flap covers the tank cap and closes more or less flush with the surface of the side wall of the vehicle chassis, only if the tank cap is situated in a predefined position, in which the tank cap closes the filling opening in a fluid-tight manner. That is, the tank cap is arranged at a specific angle relative to the tank flap. This arrangement ensures that the tank cap sits on the filling opening in a correct position and that it is not tilted or is not totally screwed in as far as the end stop. If the tank cap is not arranged on the filling opening in the correct position, then the surface structure of the inner side face of the tank flap will not engage with the corresponding surface structure of the outer side face of the tank closure in a positive locking manner. Thus, during a closing movement of the tank flap, the tank flap is blocked by the surface structure of the tank cap from reaching its closed position. As a result, the user of a motor vehicle is signaled in an advantageous way that the tank cap is not in its correct position to close the filling opening in a fluid-tight manner.

The above feature makes it possible to check, in a simple and cost-effective way, whether the filling opening of a tank is correctly closed. In particular, in the case of vehicles with devices for conducting an automatic leak test on the fuel tank, it can be detected at an early stage whether there is an error that should be corrected by a service center or whether the tank has been merely improperly closed. Hence, it is possible to avoid unnecessary time spent at the service center and to reduce warranty costs.

According to a first advantageous further development of the tank closure according to the invention, the tank cap is designed with a bayonet catch for closing the filling opening.

In the case of such a further development, the filling opening is preferably arranged in a tank neck of the fuel tank. The tank cap can be connected preferably to the tank neck by way of an insert and rotate motion. Preferably, the tank neck exhibits an oblong slot having an end that is connected to a short transverse slot that is shaped in the manner of a thread. The tank cap includes, preferably, an element that is shaped in the manner of a knob that is first introduced into the oblong slot and then wedged in the transverse slot. As a result, a secure connection between the tank cap and the tank neck is guaranteed. A tank closure is provided that is easy to close and detach again.

The present further development has proven to be advantageous, in particular, with respect to the above-described state of the art. In contrast to the cited state of the art, the present further development of the tank closure also signals an incorrectly closed tank cap, when this tank cap does not "protrude" or "project" in relation to its actually correct position.

According to a second advantageous further development of the tank closure according to the invention, the tank cap has an elevation that engages with a depression in the tank flap in a positive locking manner, when the tank cap and the tank flap are in a closed position.

Such a surface structure is especially easy and cost-effective to manufacture. When the tank cap is at a defined angle relative to the tank flap, the elevation in the outer side face of the tank cap engages with the depression in the inner side face of the tank flap in a positive locking manner.

The depression in the inner side face of the tank flap can be provided, for example, by way of a plastic injection mold that is inserted into the tank flap. Moreover, a tank flap, made of sheet metal, with such a depression can also be molded or, more specifically, extruded.

According to a third advantageous further development of the tank closure according to the invention, the elevation is designed as a gripping ridge. This further development provides a tank closure that has a tank cap which guarantees an especially easy operation.

According to a fourth advantageous further development of the tank closure according to the invention, the depression is defined by at least two ridges that form an inner space, with which the gripping ridge engages.

Preferably, two ridges are arranged in parallel to each other on the inner side face of the tank flap; and these two ridges form an inner space. When the tank flap and the tank cap are in a closed position, the gripping ridge on the outer side face of the tank cap engages with the inner space, formed by the ridges, in a precisely fitting manner.

According to a fifth advantageous further development of the tank closure according to the invention, the tank flap has a shell, which is formed with the ridges as an integral plastic injection molded part. Such a tank flap is inexpensive to manufacture and easy to assemble with other components in the production process.

According to a sixth advantageous further development of the tank closure according to the invention, the ridges are constructed as a plastic injection molded part and are connected to a shell of the tank flap. Such ridges exhibit a low intrinsic weight and are inexpensive to produce in the manufacturing process. Such ridges lend themselves especially well to being connected, for example by way of adhesive cementing, to an inner casing of a tank flap.

According to a seventh advantageous further development of the tank closure according to the invention, the tank flap can be brought from an open position into a closed position by a first movement; and the tank cap can be brought from an open position into a closed position by a second movement; and a force can be transferred to the tank cap by the first movement of the tank flap, as a result of which the second movement of the tank cap can be carried out.

In the case of such a further development of the tank closure according to the invention, the tank flap has an inclined section on the inner side face, preferably with respect to a flat side face. During a first movement, in the course of which the tank flap is moved from an open position into a closed position, the tank flap is pushed against a tank cap, which is placed on a filling opening, with the inclined section. This feature allows a force to be exerted on the tank cap; and this force causes the tank cap to move into a position that closes the filling opening in a fluid-tight manner. That is, the first movement of the tank flap induces a second movement of the tank cap; and this second movement induces the tank cap to move into its correct position. At the same time, the tank cap rotates with relative ease of motion; and the tank cap need only be rotated over a small angular range.

According to an eighth advantageous further development of the tank closure according to the invention, the tank cap is connected in a loss-proof manner to the filling opening of the tank by use of a connecting element. In the case of such a further development, the tank cap is connected to the filling opening, for example, by a chain or a cable. If the tank cap is not placed on the filling opening, then just the fact that the connecting element is hanging out, namely because the tank flap is blocking it, prevents the tank flap from being able to occupy a closed position. Furthermore, it can be seen very clearly that the tank cap is hanging down along the side wall of the vehicle chassis and signals that the filling opening is not correctly closed.

Furthermore, the invention provides a motor vehicle with such an advantageous tank closure. The motor vehicle according to the invention is equipped in an advantageous way with a tank closure according to the above-described features. Such a tank closure guarantees that it can always be checked in a cost-effective way whether a fuel tank is closed in a fluid-tight manner. This feature makes it possible to avoid unnecessary time spent at the service center, especially in the case of motor vehicles that have a device for conducting an automatic leak test on the fuel tank; and this feature also makes it possible to reduce the warranty costs on the part of the manufacturers.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
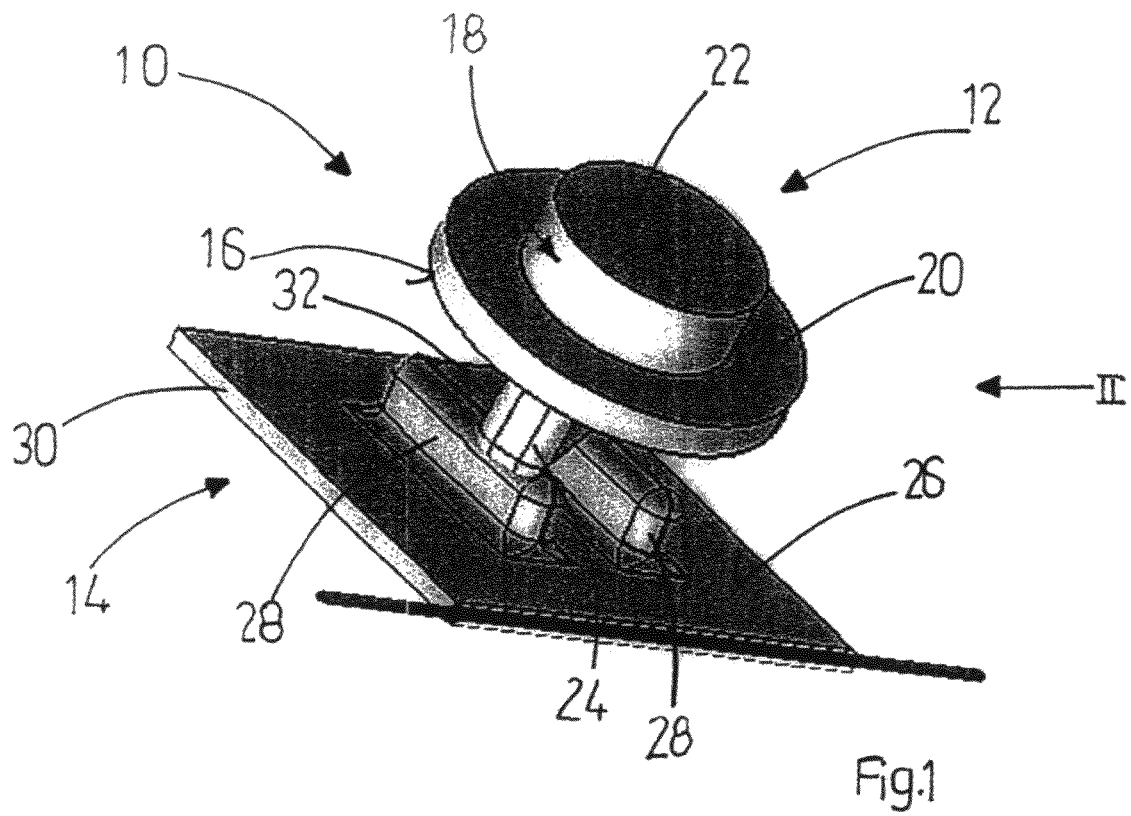
FIG. 1 is a perspective view of an exemplary inventive tank closure in a position in which the filling opening is not closed.
Figure 2:
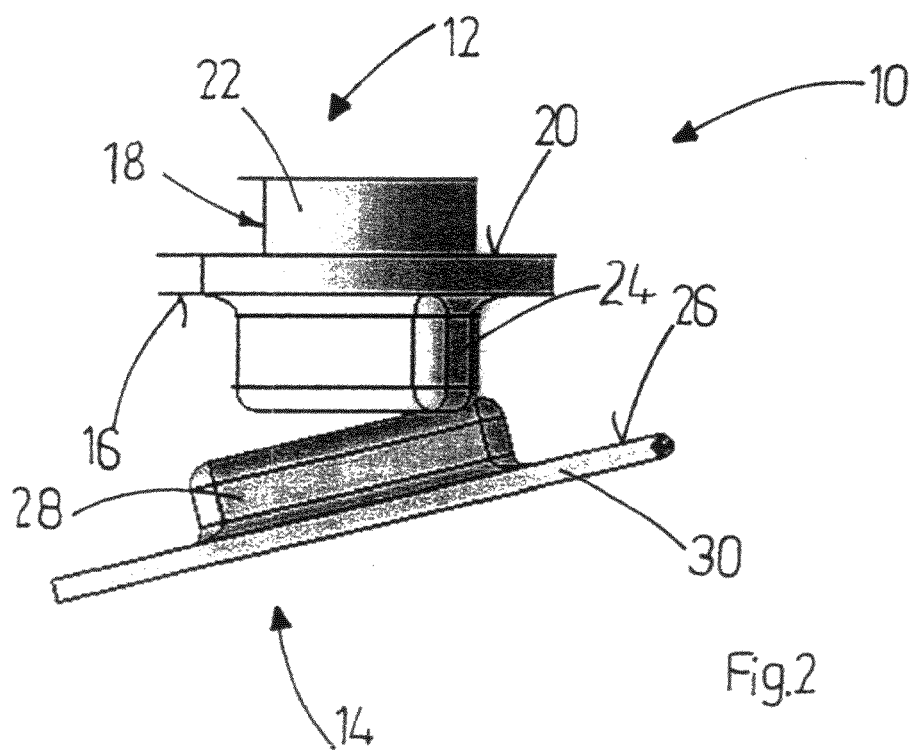
FIG. 2 is a side view taken along arrow II from FIG. 1.

FIGS. 1 and 2 show an exemplary inventive tank closure 10 for selectively closing and opening a tank filling opening of a motor vehicle (not illustrated herein). The tank closure according to FIGS. 1 and 2 is shown in a position, in which the tank filling opening is not correctly closed. The tank closure 10 includes a tank cap 12 and a tank flap 14, which can release or expose the tank cap 12 in a first position or can totally cover the tank cap in a second position, in a so-called closed position, by way of a swiveling/pivoting or more specifically folding movement.

The tank cap 12 has a shoulder 18 on an inner side 16 facing the tank filling opening; and this shoulder has a bayonet catch 20 (not shown in detail). The shoulder 18 is designed in such a way that it can be inserted into an opening of a filler neck of the fuel tank (not illustrated herein). In this context, the bayonet catch 20 engages with a complementary threaded socket in an inner wall of the filler neck, so that the filler neck can be closed in a fluid-tight manner by way of an insert and rotate motion, or opened again. An outer side 16 facing the tank flap 14 has an elevation in the form of a gripping ridge 24, by which a user can grip and handle the tank cap 12 in a simple and easy way.

The tank flap 14 is mounted on an outer vehicle wall of a vehicle chassis (not illustrated herein) in such a way that the tank flap 14 can be pivoted, or more specifically folded, so that it can selectively cover or release the tank cap 12 by way of the pivoting or folding movement. That is, the tank flap 14 totally covers or releases the tank cap 12 in the closed position. The tank flap 14 has two ridges 28 on an inner side 26 facing the outer side 16 of the tank cap 12. The two ridges 28 are made of a plastic injection molded part and are connected to an inner casing 30 of the tank flap 14. The two ridges 28 are spaced apart in parallel to each other and enclose or define an inner space 32. The distance between the two ridges 28 is adapted to the shape of the gripping ridge 24, so that the gripping ridge 24 engages with the inner space 32 in a positive locking manner, when the tank cap 12 is situated in a predefined position, in which the tank filling opening is closed in a fluid-tight manner, and the tank flap 14 is pivoted or more specifically folded onto the tank cap 12. In the present embodiment shown in FIGS. 1 and 2, the tank cap 12 is situated in a position, in which the tank filling opening is not correctly closed, so that during a folding movement of the tank flap 14 onto the tank cap 12 the inner space 32, which is formed by the two ridges 28, does not receive or positively engage with the gripping ridge 24 of the tank cap 12. The tank flap 14 is thus blocked by the gripping ridge 24 and cannot occupy its closed position. That is, the tank flap 14 does not come to lie flush with the surface of the outer wall of the vehicle chassis, but rather projects from this outer wall. As a result, the user of the motor vehicle is signaled that the tank cap 12 is not closing the tank filling opening in a fluid-tight manner.

Figure 3:
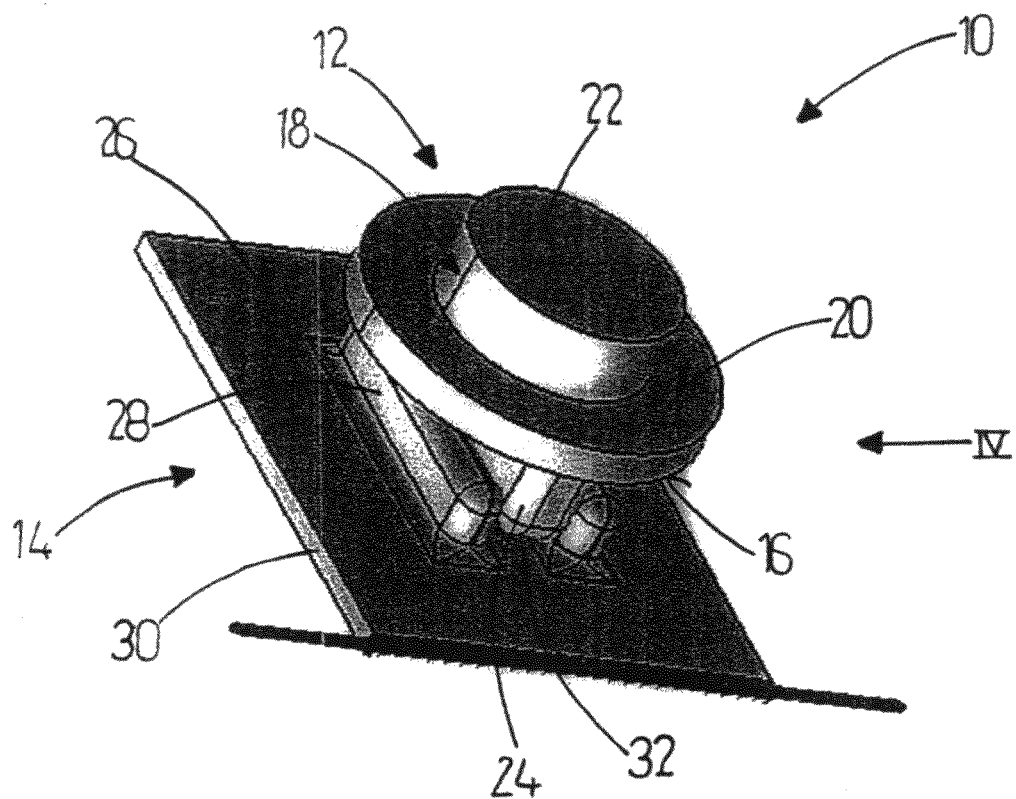
FIG. 3 is a perspective view of the tank closure, according to FIG. 1, in a position in which the filling opening is closed.
Figure 4:
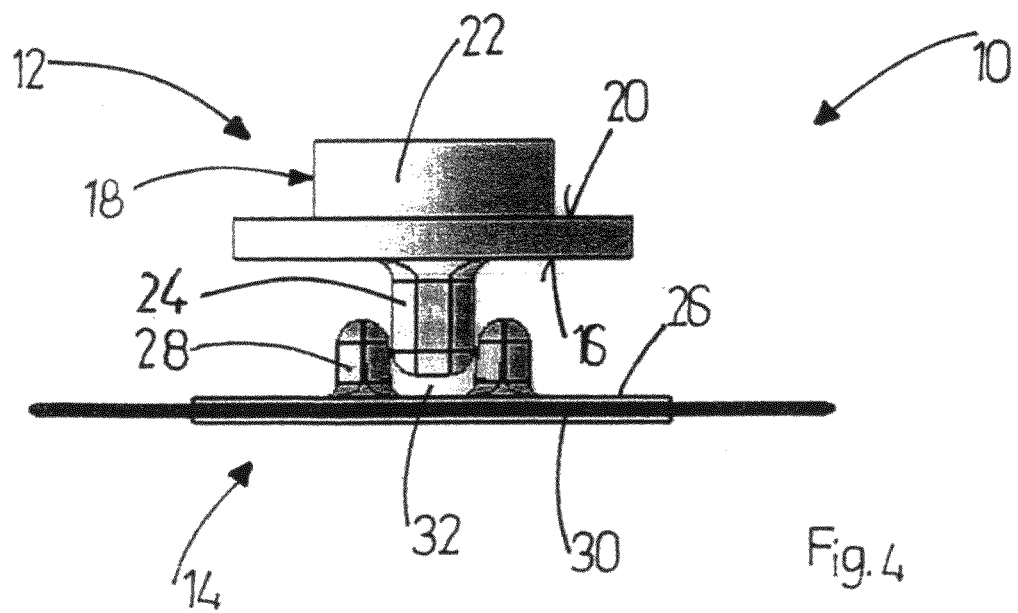
FIG. 4 is a side view taken along arrow IV from FIG. 3.

FIGS. 3 and 4 show the exemplary inventive tank closure 10 in a properly closed position. That is, the tank cap 12 is correctly positioned in the tank filling opening and is closing the same in a fluid-tight manner.

During a pivoting or more specifically folding movement of the tank flap 14 in the direction of the tank cap 12, the sides 16, 26, which face each other, namely the gripping ridge 28 and the inner space 32, engage with each other in a positive locking manner. In the closed position of the tank closure 10, the tank flap 14 totally covers the tank cap 12 and lies flush with the surface of the outer wall of the vehicle chassis. The user of the vehicle is signaled in this way that the tank cap 12 is situated in a position, in which the tank filling opening is closed in a fluid-tight manner.

LIST OF REFERENCE NUMERALS 10 tank closure
12 tank cap
14 tank flap
16 outer side of the tank cap
18 shoulder
20 bayonet catch
22 inner side of the tank cap
24 gripping ridge
26 inner side of the tank flap
28 ridge
30 casing
32 inner space The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A tank closure system for closing a filling opening of a tank, comprising:
   a tank cap operatively configured to close the filling opening;
   a tank flap operatively configured to cover the tank cap, wherein:
      the tank cap comprises an elevation configured as a gripping ridge, the elevation being arranged on an outer side of the tank cap facing the tank flap,
      the tank cap further comprising a bayonet catch by which the tank cap closes the filling opening,
      the tank flap comprising a depression on a side of the tank flap facing the tank cap, the depression being configured to engage the elevation of the tank cap in a positive locking manner when the tank cap is in a predetermined position relative to the tank flap, the predetermined position properly closing the filling opening.

2. The tank closure system according to claim 1, wherein the depression is defined by at least two ridges formed on the tank flap, said two ridges defining an inner space in which the gripping ridge engages.

3. The tank closure system according to claim 2, wherein the tank flap comprises a shell having the at least two ridges formed thereon as an integral plastic injection molded part.

4. The tank closure system according to claim 2, wherein the at least two ridges comprise a plastic injection molded part operatively connected to a shell of the tank flap.

5. The tank closure system according to claim 1, wherein:
the tank flap is operatively configured to move from an open position into a closed position via a first movement;
the tank cap is operatively configured to move from an open position into a closed position via a second movement; and
the first movement of the tank flap transferring a force to the tank cap to cause the second movement of the tank cap.

6. The tank closure system according to claim 1, further comprising a connecting element operatively configured to connect the tank cap in a loss-proof manner to the filling opening of the tank.

7. A motor vehicle, comprising:
a tank closure system for closing a filling opening of a tank, the tank closure system comprising:
a tank cap operatively configured to close the filling opening;
a tank flap operatively configured to cover the tank cap, wherein:
the tank cap comprises an elevation configured as a gripping ridge, the elevation being arranged on an outer side of the tank cap facing the tank flap,
the tank cap further comprising a bayonet catch by which the tank cap closes the filling opening,
the tank flap comprising a depression on a side of the tank flap facing the tank cap, the depression being configured to engage the elevation of the tank cap in a positive locking manner when the tank cap is in a predetermined position relative to the tank flap, the predetermined position properly closing the filling opening.

* * * * *